(12) United States Patent
Slooff

(10) Patent No.: US 10,411,514 B2
(45) Date of Patent: Sep. 10, 2019

(54) CONTAINER OF CONSUMER GOODS HAVING A WIRELESSLY POWERED ELECTRONIC DEVICE

(71) Applicant: PHILIP MORRIS PRODUCTS S.A., Neuchatel (CH)

(72) Inventor: Arjen Hamilcar Slooff, Rhenen (NL)

(73) Assignee: Philip Morris Products S.A., Neuchatel (CH)

( * ) Notice: Subject to any disclaimer, the term of this patent is extended or adjusted under 35 U.S.C. 154(b) by 133 days.

(21) Appl. No.: 15/320,808

(22) PCT Filed: Aug. 13, 2015

(86) PCT No.: PCT/EP2015/068713
§ 371 (c)(1),
(2) Date: Dec. 21, 2016

(87) PCT Pub. No.: WO2016/024002
PCT Pub. Date: Feb. 18, 2016

(65) Prior Publication Data
US 2017/0197777 A1    Jul. 13, 2017

(30) Foreign Application Priority Data

Aug. 13, 2014 (EP) .................... 14180897

(51) Int. Cl.
*A24F 15/00* (2006.01)
*H02J 50/12* (2016.01)
(Continued)

(52) U.S. Cl.
CPC .............. *H02J 50/12* (2016.02); *A24F 15/00* (2013.01); *B65B 11/004* (2013.01); *B65B 19/22* (2013.01);
(Continued)

(58) Field of Classification Search
CPC combination set(s) only.
See application file for complete search history.

(56) References Cited

U.S. PATENT DOCUMENTS 6,177,871 B1    1/2001    Rasband
7,093,711 B2    8/2006    Draghetti
(Continued)

FOREIGN PATENT DOCUMENTS

CN    1509959 A    7/2004
CN    201189973    2/2009
(Continued)

OTHER PUBLICATIONS

Extended European Search Report for Application No. 14180897.2 dated Feb. 9, 2015 (5 pages).
(Continued)

*Primary Examiner* — Daniel J Cavallari
(74) *Attorney, Agent, or Firm* — Mueting, Raasch & Gebhardt, P.A.

(57) ABSTRACT

There is provided a container (30) of consumer goods, the container (30) comprising a wrapped bundle of consumer goods (10) comprising a wrapper (16) wrapped around one or more consumer goods. The wrapper (16) comprises a folded laminar blank comprising at least one carrier layer (12) and at least one conductive layer (13), the at least one conductive layer (13) forming at least one power transfer receiver coil (14) configured to wirelessly receive a supply of electrical energy. The container (30) further comprises an outer housing (31) containing the wrapped bundle of consumer goods (10), and an electronic device (38) connected to the at least one power transfer receiver coil (14) to receive the supply of electrical energy.

13 Claims, 1 Drawing Sheet

Figure 1:
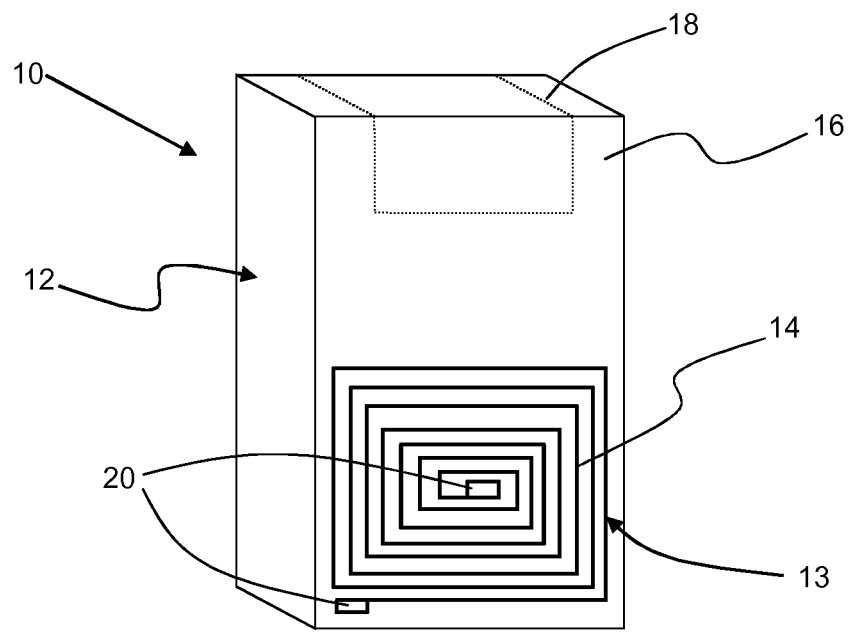

(51) Int. Cl.
*B65D 79/02* (2006.01)
*B65B 11/00* (2006.01)
*B65B 19/22* (2006.01)
*B65B 61/20* (2006.01)
*B65D 85/10* (2006.01)
*H02J 7/02* (2016.01)

(52) U.S. Cl.
CPC .............. *B65B 61/20* (2013.01); *B65D 79/02* (2013.01); *B65D 85/1054* (2013.01); *B65D 85/1081* (2013.01); *H02J 7/025* (2013.01); *B65D 2203/12* (2013.01)

(56) References Cited

U.S. PATENT DOCUMENTS

| | | | |
|---|---|---|---|
| 8,604,907 | B2 | 12/2013 | Ludwig |
| 2005/0072707 | A1 | 4/2005 | Bahar |
| 2007/0146142 | A1 | 6/2007 | Cote |
| 2009/0284164 | A1 | 11/2009 | Ray |
| 2014/0210280 | A1* | 7/2014 | Simeth ................. B65D 79/02 307/149 |

FOREIGN PATENT DOCUMENTS

| | | |
|---|---|---|
| CN | 2014400393 | 2/2010 |
| CN | 201614102 | 10/2010 |
| CN | 102715812 | 10/2012 |
| DE | 102007043407 | 3/2009 |
| DE | 102008019964 | 10/2009 |
| EP | 1 422 168 | 5/2004 |
| EP | 1422168 A1 * | 5/2004 ......... B65D 85/1072 |
| EP | 2645385 | 10/2013 |
| JP | 2004-196423 | 7/2004 |
| JP | 2005-234871 | 9/2005 |
| JP | 2009-521755 | 6/2009 |
| JP | 2010-540353 | 12/2010 |
| TW | 201139231 | 11/2011 |
| WO | WO-9958406 A1 * | 11/1999 ............. B65D 5/542 |
| WO | WO 2007/073529 | 12/2005 |
| WO | WO 2010/055312 | 5/2010 |
| WO | WO 2011/051076 | 5/2011 |
| WO | WO 2013/182673 | 12/2013 |

OTHER PUBLICATIONS

Office Action issued in China for Application No. 201580042345.6 dated Jun. 13, 2018 (24 pages). English translation included.
PCT Search Report and Written Opinion for PCT/EP2015/068713 dated Oct. 20, 2015 (10 pages).
Office Action issued in Taiwan for Application No. 104126200 dated May 27, 2019 (15 pages). English translation included.
Office Action issued in Japan for Application No. 2017-500391 dated May 23, 2019 (6 pages). English translation included.

* cited by examiner

CONTAINER OF CONSUMER GOODS HAVING A WIRELESSLY POWERED ELECTRONIC DEVICE

This application is a U.S. National Stage Application of International Application No. PCT/EP2015/068713, filed Aug. 13, 2015, which was published in English on Feb. 18, 2016 as International Publication No. WO 2016/024002 A1. International Application No. PCT/EP2015/068713 claims priority to European Application No. 14180897.2 filed Aug. 13, 2014.

The present invention relates to a container of consumer goods comprising a wirelessly powered electronic device. The invention also relates to a method of manufacturing the container and a system for operating the electronic device. Containers according to the present invention find particular application as containers of elongate smoking articles, such as cigarettes.

Consumer goods such as smoking articles are commonly packaged in rigid box shaped containers, such as hinge-lid containers having a box and a lid connected to the box about a hinge line extending across the back wall of the container. The container may house an inner bundle comprising one or more consumer goods wrapped in a wrapper. Indeed, typically, for cigarette packs, an inner bundle is produced by folding an inner liner around a charge of cigarettes.

Containers of consumer goods typically provide only a limited number of ways for the manufacturer to communicate with the consumer. For example, typically manufacturers rely on colours, text, graphics, shape, surface texture and such like, either with respect to the container itself or one or more inserts provided within the container, to communicate with the consumer.

WO2007/073529 A2 describes a cigarette pack having a 'marker' that comprises magnetic resonating means that allow the marker to be detectable by means of an electromagnetic field. The marker is primarily provided on the outer housing of the pack, but could alternatively be applied to an outer surface of a foil wrapping material, by means of an adhesive plastic label. However, this can add complexity to the manufacturing process and require the use of additional components.

It would be desirable to provide a novel means of using a container of consumer goods to communicate with a consumer, without requiring major modification of the manufacturing machinery or processes for forming such a container.

In accordance with a first aspect of the present invention, there is provided a container of consumer goods, the container comprising a wrapped bundle of consumer goods comprising a wrapper wrapped around one or more consumer goods. The wrapper comprises a multilayer folded laminar blank comprising at least one carrier layer and at least one conductive layer that is applied directly to a surface of the carrier layer, the at least one conductive layer forming at least one power transfer receiver coil configured to wirelessly receive a supply of electrical energy. The container further comprises an outer housing containing the wrapped bundle of consumer goods, and an electronic device connected to the at least one power transfer receiver coil to receive the supply of electrical energy.

The term "carrier layer" is used herein to refer to a layer of non-conductive material on which at least one conductive layer is applied. The carrier layer may function as an insulating layer to electrically isolate the at least one conductive layer from other conductive materials within the container. Additionally, or alternatively, the carrier layer may function as a structural element and maintain the required shape and form of the wrapper wrapped around the one or more consumer goods.

The term "conductive layer" is used herein to refer to a layer of electrically conductive material. The conductive layer may be formed separately and applied to a carrier layer. Alternatively, the conductive layer may be formed directly on a carrier layer.

The term "power transfer receiver coil" is used herein to refer to a coil of electrically conductive material arranged to conduct an induced electrical current when the coil is positioned within a time varying magnetic field. That is, the power transfer receiver coil is arranged to wirelessly receive a supply of electrical energy. The power transfer receiver coil may be a two-dimensional coil or a three-dimensional coil.

The term "electronic device" is used herein to refer to one or more electrical components arranged to receive the supply of electrical energy from the at least one power transfer receiver coil. The electronic device may be a single electrical component, or the electronic device may comprise multiple electronic components arranged to form one or more electrical circuits. The electronic device comprises one or more terminals for electrically connecting the electronic device to the at least one power transfer receiver coil.

The electronic device on containers according to the present invention advantageously provides a novel means for the manufacturer to communicate with a consumer. Furthermore, powering the electronic device via a wireless power transfer receiver coil provided on a wrapper inside the container facilitates manufacture of the containers with minimal modification to existing production processes and machinery. In particular, the conductive layer forms a layer of the multilayer wrapper and is applied directly onto a surface of the carrier layer. This can allow the conductive layer and the carrier layer to be formed with minimal modification to existing production processes and machinery that exist for forming such multilayer wrappers, such as multilayer wrappers having a cellulosic or filmic based underlayer, on which a metallic coating is provided.

Utilising a wireless power transfer receiver coil also eliminates the need to provide potentially large, heavy and expensive power supplies within each container. Instead, a single external wireless power supply can be used to power multiple containers according to the present invention. For example, if the external wireless power supply is incorporated into a point of sale within a retail outlet, the electronic device cannot be activated during transit and storage of the container prior to the container being displayed at the point of sale.

The at least one power transfer receiver coil may be provided on only one wall of the wrapped bundle of consumer goods. In this case, the at least one power transfer receiver coil is preferably provided on the wall having the largest surface area. For example, for those containers having dimensions similar to a conventional hinge-lid box the at least one power transfer receiver coil is preferably provided on the front wall or the back wall of the wrapped bundle of consumer goods.

Alternatively, the at least one power transfer receiver coil may be provided on two or more walls of the wrapped bundle of consumer goods. In a preferred embodiment, the wrapped bundle of consumer goods comprises a front wall, a back wall, a top wall, a bottom wall and two side walls, and the at least one power transfer receiver coil is provided on two or three of the walls.

By providing the at least one power transfer receiver coil on multiple walls of the wrapped bundle of consumer goods, it is possible to accommodate different orientations of the container with respect to a wireless power source. Therefore, in a particularly preferred embodiment, the walls on which the at least one power transfer receiver coil is provided are non-opposing walls. That is, each wall on which the at least one power transfer receiver coil is provided is not opposite any of the other walls on which the at least one power transfer receiver coil is provided.

The terms "front", "back", "top", "bottom", "side", and other terms used to describe relative positions of the components of containers according to the present invention refer to the container in an upright position with any opening through which the consumer goods are removed at the top end. In some embodiments the container may comprise a lid. Preferably, the lid is moveable about a hinge line at the back of the container.

In those embodiments in which the at least one power transfer receiver coil is provided on multiple walls of the wrapped bundle of consumer goods, the at least one power transfer receiver coil may comprise a single power transfer receiver coil that extends over multiple walls of the container. Alternatively, the at least one power transfer receiver coil may comprise multiple power transfer receiver coils each provided substantially on a different wall of the wrapped bundle of consumer goods. For example, the at least one power transfer receiver coil may comprise a first power transfer receiver coil provided substantially on the front wall of the wrapped bundle of consumer goods, a second power transfer receiver coil provided substantially on a side wall of the wrapped bundle of consumer goods, and a third power transfer receiver coil provided substantially on the bottom wall of the wrapped bundle of consumer goods.

Although each power transfer receiver coil may be provided substantially on a single wall, electrical terminals at each end of each coil may extend onto a different wall. For example, in those embodiments comprising first, second and third power transfer receiver coils as described previously, the terminals at the end of each of the second and third power transfer receiver coils may extend onto the front wall of the wrapped bundle of consumer goods so that all of the power transfer receiver coil terminals are provided on the front wall of the wrapped bundle of consumer goods. Providing all of the terminals on a single wall of the wrapped bundle of consumer goods may facilitate connection of the terminals to the electronic device.

In any of the embodiments described above, the outer housing may comprise an inner surface facing the wrapped bundle of consumer goods, wherein the connection between the electronic device and the at least one power transfer receiver coil underlies the inner surface of the outer housing, and wherein at least a portion of the electronic device is visible from the outside of the container. For example, the electronic device may comprise one or more electronic components mounted on an outer surface of the outer housing and one or more wires or other conductive elements extending through one or more apertures in the outer housing and electrically connecting the one or more electronic components to the at least one power transfer coil at the inner surface of the outer housing. Alternatively, the electronic device may be mounted on the inner surface of the outer housing, wherein the outer housing comprises an aperture through which the electronic device is visible from the outside of the container.

In any of the embodiments described above, the electronic device is preferably configured to convey, or instigate the conveyance of, information to a consumer. For example, the electronic device may be configured to convey to the consumer at least one of a visual signal, an audio signal and a tactile signal. Preferably, the electronic device comprises at least one of an electroluminescent device, an electro-acoustic device, and an electro-mechanical device. For example, the electronic device may comprise one or more of a light emitting diode, an electroluminescent panel, a speaker, a piezoelectric device, a liquid crystal display, and a motor.

Additionally, the electronic device may comprise a switch to allow a consumer to enable or disable the electronic device. For example, the switch may be a mechanical switch or a solid state switch. In the case of a solid state switch, the switch may be activated using a resistive or a capacitive sensor arranged to sense a consumer's touch.

In any of the embodiments described above, the electronic device may comprise means for interacting with electronic devices on similar containers. For example, the electronic device may comprise a conductive electrical interface arranged to connect to a corresponding conductive electrical interface on another container. Additionally, or alternatively, the electronic devices on two or more containers may comprise means for wirelessly interacting with each other. In any of these embodiments, each electronic device may be arranged so that it is fully activated only upon interaction with an electronic device on another container. For example, in those embodiments in which the electronic device on each container comprises a conductive electrical interface, the electronic devices may be arranged such that an electrical circuit is completed only when the conductive electrical interfaces of two or more containers are connected to each other.

In any of the embodiments described above, the container may further comprise a chargeable device, such as a capacitor or a battery, wherein the chargeable device is arranged to receive and store the supply of electrical energy from the at least one power transfer receiver coil, and wherein the chargeable device is arranged to subsequently deliver the stored supply of electrical energy to the electronic device. For example, the container may comprise a battery arranged to store an electrical charge when the container is placed within a time varying magnetic field at a point of sale. This advantageously provides a stored supply of electrical energy that allows the electronic device to continue to function after the container has been removed from the time varying magnetic field. Furthermore, it also eliminates the need to provide a battery that is pre-charged during manufacture and may lose its charge during storage and transit before reaching the consumer. Providing a chargeable device is particularly advantageous in those embodiments in which the electronic device comprises at least one of a switch and a means for interacting with electronic devices on similar containers, as the combination of one or both of these features with a chargeable device can provide the consumer with a choice over when to activate the electronic device.

The at least one conductive layer that forms the at least one power transfer receiver coil may comprise any suitable electrically conductive material. Particularly suitable conductive materials include aluminium, copper, silver, graphite, and combinations thereof.

The at least one conductive layer may be pre-formed and subsequently directly applied to a surface of the at least one carrier layer. Alternatively, the at least one conductive layer may be formed from a material that is deposited directly onto the at least one carrier layer so that the at least one conductive layer is formed on the at least one carrier layer.

The at least one conductive layer may comprise a single conductive layer applied to a surface of a carrier layer. In this case, the single conductive layer is preferably applied to the surface of the carrier layer that forms the outer surface of the wrapped bundle of consumer goods, for ease of connection of the at least one power transfer receiver coil to the electronic device. Alternatively, the at least one conductive layer may comprise a first conductive layer applied to a first surface of a carrier layer and a second conductive layer applied to a second surface of the carrier layer. In a yet further alternative, the laminar blank may comprise multiple carrier layers and multiple conductive layers. The skilled person can select a particular configuration of conductive layers, carrier layers and power transfer receiver coils depending on the size and shape of the wrapped bundle of consumer goods, the type and power of the wireless power source, the orientation of the container with respect to the wireless power source, and the type of electronic device on the container.

In those embodiments in which one or more conductive layers form at least one power transfer coil on one or both of the inner and outer surfaces of the wrapper, an electrically insulating layer may be applied over substantially the whole of the one or more conductive layers to electrically insulate the conductive layers from other parts of the container. Preferably, such an electrically insulating layer covers the entire conductive layer with the exception of one or more terminals for electrically connecting the one or more power transfer receiver coils to the electronic device, as described above. Suitable electrically insulating materials include plastic materials such as polyethylene terephthalate, polypropylene, polyethylene, poly(3,4-ethylenedioxythiophene) polystyrene sulfonate, polymide. Additionally, or alternatively, the electrically insulating material may include one or more oil based materials, such as an electrically insulating ink.

In any of the embodiments described above, the at least one carrier layer preferably comprises at least one surface on which the at least conductive layer is applied, wherein the at least one surface has a Parker Print-Surf roughness of less than about 2 micrometers measured in accordance with ISO 8791-4. A Parker Print-Surf roughness of less than about 2 micrometers provides a smooth surface that optimises the application of the at least one conductive layer to the carrier layer, particularly in those embodiments in which a conductive material is deposited directly onto the carrier layer to form at least one conductive layer on the carrier layer. The material forming the at least one carrier layer may inherently have a surface having a Parker Print-Surf roughness of less than about 2 micrometers. Alternatively, a coating, such as a lacquer, may be applied to the surface of the material forming the carrier layer to provide the required smoothness.

Suitable materials for forming the at least one carrier layer include cellulosic materials, filmic material, and combinations thereof.

Containers according to the present invention find particular application as a container of elongate consumer goods, such as smoking articles. Therefore, in any of the embodiments described above, the bundle of consumer goods may comprise a plurality of smoking articles, such as, for example, cigarettes, cigars or cigarillos. It will be appreciated that through appropriate choices of the dimensions thereof, containers according to the invention may be designed for different numbers of conventional size, king size, super-king size, slim or super-slim cigarettes.

Through an appropriate choice of the dimensions thereof, containers according to the invention may be designed to hold different total numbers of smoking articles, or different arrangements of smoking articles. For example, through an appropriate choice of the dimensions thereof, containers according to the invention may be designed to hold a total of between ten and thirty smoking articles.

The smoking articles in the container may be arranged in different collations, depending on the total number of smoking articles. For example, the smoking articles may be arranged in a single row of six, seven, eight, nine or ten. Alternatively, the smoking articles may be arranged in two or more rows. The two or more rows may contain the same number of smoking articles. For example, the smoking articles may be arranged in: two rows of five, six, seven, eight, nine or ten; three rows of five or seven; or four rows of four, five or six. Alternatively, the two or more rows may include at least two rows containing different number of smoking articles to each other. For example, the smoking articles may be arranged in: a row of five and a row of six (5-6); a row of six and a row of seven (6-7); a row of seven and a row of eight (7-8); a middle row of five and two outer rows of six (6-5-6); a middle row of five and two outer rows of seven (7-5-7); a middle row of six and two outer rows of five (5-6-5); a middle row of six and two outer rows of seven (7-6-7); a middle row of seven and two outer rows of six (6-7-6); a middle row of nine and two outer rows of eight (8-9-8); or a middle row of six with one outer row of five and one outer row of seven (5-6-7).

Containers according to the present invention may hold smoking articles of the same type or brand, or of different types or brands. In addition, both filterless smoking articles and smoking articles with various filter tips may be contained, as well as smoking articles of differing length (for example, between about 40 mm and about 180 mm), diameter (for example, between about 4 mm and about 9 mm). In addition, the smoking articles may differ in strength of taste, resistance to draw and total particulate matter delivery. Preferably, the dimensions of the container are adapted to the length of the smoking articles, and the collation of the smoking articles. Typically, the outer dimensions of the container are between about 0.5 mm to about 5 mm larger than the dimensions of the bundle or bundles of smoking articles housed inside the container.

The length, width and depth of containers according to the invention may be such that, in the closed position, the resultant overall dimensions of the container are similar to the dimensions of a typical disposable hinge-lid pack of twenty cigarettes.

Preferably, containers according to the invention have a height of between about 60 mm and about 150 mm, more preferably a height of between about 70 mm and about 125 mm, wherein the height is measured from a top wall to a bottom wall at the exterior of the container.

Preferably, containers according to the invention have a width of between about 12 mm and about 150 mm, more preferably a width of between about 70 mm and about 125 mm, wherein the width is measured from one side wall to the other side wall at the exterior of the container.

Preferably, containers according to the invention have a depth of between about 6 mm and about 100 mm, more preferably a depth of between about 12 mm and about 25 mm wherein the depth is measured from the front wall to the back wall at the exterior of the container.

Preferably, the ratio of the height of the container to the depth of the container is in between about 0.3 to 1 and about 10 to 1, more preferably between about 2 to 1 and about 8 to 1, most preferably between about 3 to 1 and 5 to 1.

Preferably, the ratio of the width of the container to the depth of the container is in between about 0.3 to 1 and about 10 to 1, more preferably between about 2 to 1 and about 8 to 1, most preferably between about 2 to 1 and 3 to 1.

As well as housing a bundle of smoking articles, the container may further comprise other consumer goods, for example matches, lighters, extinguishing means, breath-fresheners or electronics. The other consumer goods may be attached to the outside of the container, contained within the container along with the smoking articles, in a separate compartment of the container or combinations thereof.

The exterior surfaces of containers according to the invention may be printed, embossed, debossed or otherwise embellished with manufacturer or brand logos, trademarks, slogans and other consumer information and indicia.

The present invention also extends to systems for operating an electronic device provided on a container of consumer goods in accordance with the first aspect of the present invention. Therefore, in accordance with a second aspect of the present invention, there is provided a system for operating an electronic device provided on a container of consumer goods, the system comprising a container of consumer goods according to any of the embodiments described above, and a power transfer transmitter configured to generate a time-varying magnetic field. The time-varying magnetic field induces the supply of electrical energy in the at least one power transfer receiver coil when the container of consumer goods is positioned within the time-varying magnetic field.

The power transfer transmitter preferably comprises a power transmission coil connected to a suitable supply of electrical energy, such as a mains electricity supply. In use, an alternating current is driven through the power transmission coil to generate the time-varying magnetic field. Preferably, the natural resonance of the power transmission coil is substantially the same as the natural resonance of the at least one power transfer receiver coil in the container, so that resonant coupling of the transmission and receiver coils is induced during operation of the system.

The power transfer transmitter may be incorporated into a point of sale apparatus, such as a shelf or a cabinet in which the containers are displayed in a retail outlet.

The present invention also extends to method of forming a container of consumer goods in accordance with any of the embodiments described above. Therefore, in accordance with a third aspect of the present invention, there is provided a method of forming a container of consumer goods, the method comprising applying at least one power transfer receiver coil directly onto a surface of at least one carrier layer to form a first multilayer laminar blank, wherein the at least one power transfer receiver coil is configured to wirelessly receive a supply of electrical energy. The first multilayer laminar blank is folded around one or more consumer goods to form a wrapped bundle of consumer goods, wherein the folded first multilayer laminar blank forms a wrapper. An electronic device is provided on a second laminar blank, and the second laminar blank is arranged around the wrapped bundle of consumer goods to form an outer housing. The electronic device is connected to the at least one power transfer receiver coil to receive the supply of electrical energy.

The order in which the method steps are described above is not intended to be limiting. For example, the at least one carrier layer could be folded around the one or more consumer goods before the at least one power transfer receiver coil is provided on the at least one carrier layer to form the wrapper. Additionally, or alternatively, the electronic device may be provided on the second laminar blank after the second laminar blank has been arranged around the wrapped bundle of consumer goods to form the outer housing.

In some embodiments, the second laminar blank is folded around the wrapped bundle of consumer goods to form the outer housing. Alternatively, the second laminar blank may be folded to form an outer housing into which the wrapped bundle of consumer goods is inserted.

The step of applying the at least one power transfer receiver coil onto the surface of the at least one carrier layer may comprise forming at least one power transfer receiver coil from at least one conductive layer, and then applying the at least one power transfer receiver coil directly onto the surface of the at least one carrier layer to form the first multilayer laminar blank.

Alternatively, the step of applying the at least one power transfer receiver coil on the at least one carrier layer may comprise depositing at least one layer of an electrically conductive material directly onto the surface of the at least one carrier layer to form the first multilayer laminar blank. In these embodiments, the step of depositing the at least one layer of electrically conductive material may comprise at least one of rotogravure printing, offset printing, flexographic printing, inkjet printing, screen printing, hot foil stamping, cold foil stamping, transfer metallizing, and direct metallizing. Forming the at least one power transfer receiver coil directly on the surface of the at least one carrier layer may be preferable, particularly in those embodiments in which the at least one power transfer receiver coil is formed from a relatively thin conductive track and would be prone to breaking if the at least one power transfer receiver coil was pre-formed and then applied to the at least one carrier layer. Suitable materials for forming the at least one conductive layer include aluminium, copper, silver, graphite, and combinations thereof.

In any of the embodiments described above, the step of providing at least one power transfer receiver coil may comprise providing the at least one power transfer receiver coil on at least one surface of the at least one carrier layer, wherein the at least one surface has a Parker Print-Surf roughness of less than about 2 micrometers measured in accordance with ISO 8791-4. As described above, a Parker Print-Surf roughness of less than about 2 micrometers provides a smooth surface that optimises the application of the at least one conductive layer to the carrier layer, particularly in those embodiments in which a conductive material is deposited directly onto the carrier layer to form the at least one power transfer receiver coil. The material forming the at least one carrier layer may inherently have a surface having a Parker Print-Surf roughness of less than about 2 micrometers. Alternatively, a coating, such as a lacquer, may be applied to the surface of the material forming the carrier layer to provide the required smoothness.

In any of the embodiments described above, the method may further comprise a step of providing an electrically conductive adhesive on at least one of the first multilayer laminar blank and the second laminar blank, and wherein the step of arranging the second laminar blank around the wrapped bundle of consumer goods brings the electrically conductive adhesive into contact with both the at least one power transfer receiver coil and the electronic device so that the electrically conductive adhesive electrically connects the electronic device to the at least one power transfer receiver coil. Using an electrically conductive adhesive can facilitate a reliable and secure electrical connection between the electronic device and the at least one power transfer receiver coil. Suitable electrically conductive adhesives include various epoxy adhesives, such as those made commercially available under the Hysol Eccobond or Ablestik Ablebond brand by Henkel AG & Company, KGaA (Dusseldorf, Germany).

In any of the embodiments described above, the at least one power transfer receiver coil may be provided on only one wall of the wrapped bundle of consumer goods. Alternatively, the at least one power transfer receiver coil may be provided on two or more walls of the wrapped bundle of consumer goods. In a preferred embodiment, the wrapped bundle of consumer goods comprises a front wall, a back wall, a top wall, a bottom wall and two side walls, and the at least one power transfer receiver coil is provided on two or three of the walls.

By providing the at least one power transfer receiver coil on multiple walls of the wrapped bundle of consumer goods, it is possible to accommodate different orientations of the container with respect to a wireless power source. Therefore, in a particularly preferred embodiment, the walls on which the at least one power transfer receiver coil is provided are non-opposing walls. That is, each wall on which the at least one power transfer receiver coil is provided is not opposite any of the other walls on which the at least one power transfer receiver coil is provided.

In those embodiments in which the at least one power transfer receiver coil is provided on multiple walls of the wrapped bundle of consumer goods, the at least one power transfer receiver coil may comprise a single power transfer receiver coil that extends over multiple walls of the container. Alternatively, the at least one power transfer coil may comprise multiple power transfer receiver coils each provided substantially on a different wall of the wrapped bundle of consumer goods. For example, the at least one power transfer receiver coil may comprise a first power transfer receiver coil provided substantially on the front wall of the wrapped bundle of consumer goods, a second power transfer receiver coil provided substantially on a side wall of the wrapped bundle of consumer goods, and a third power transfer receiver coil provided substantially on the bottom wall of the wrapped bundle of consumer goods.

Although each power transfer receiver coil may be provided substantially on a single wall, electrical terminals at each end of each coil may extend onto a different wall. For example, in those embodiments comprising first, second and third power transfer receiver coils as described previously, the terminals at the end of each of the second and third power transfer receiver coils may extend onto the front wall of the wrapped bundle of consumer goods so that all of the power transfer receiver coil terminals are provided on the front wall of the wrapped bundle of consumer goods. Providing all of the terminals on a single wall of the wrapped bundle of consumer goods may facilitate connection of the terminals to the electronic device.

Figure 2:
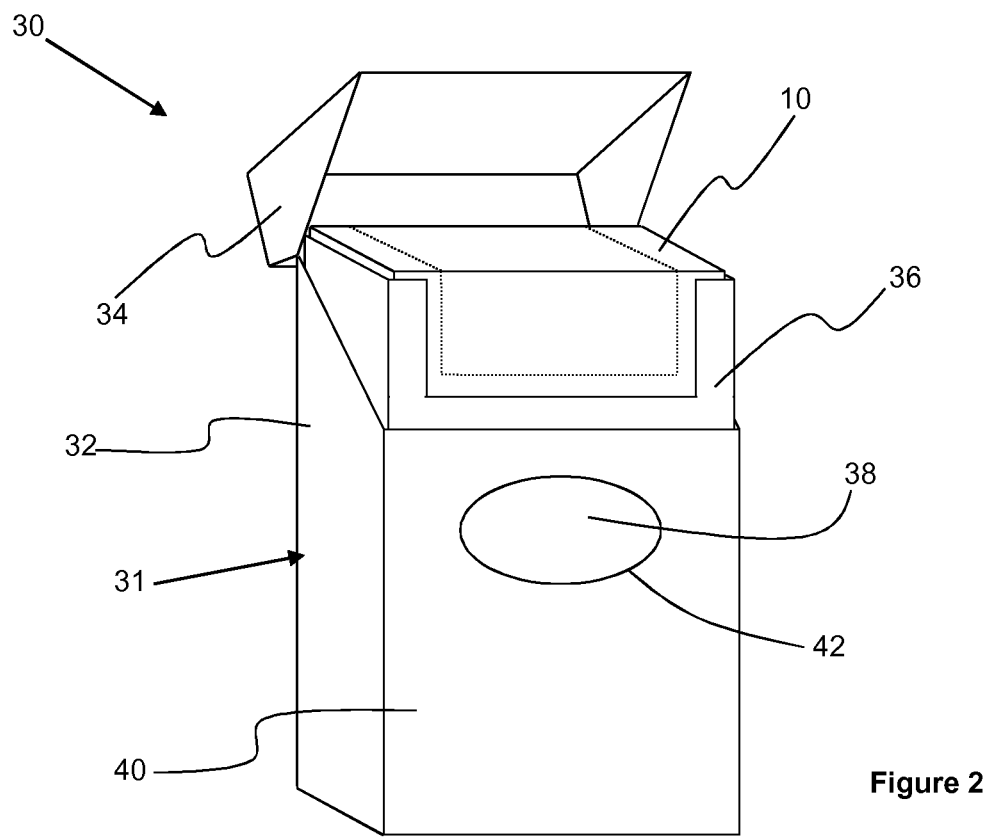

The invention will now be further described by way of example only with reference to the drawings in which:

FIG. 1 shows a wrapped bundle of consumer goods in accordance with an embodiment of the present invention; and FIG. 2 shows a container comprising the wrapped bundle of consumer goods shown in FIG. 1.

FIG. 1 shows a wrapped bundle of consumer goods 10 in accordance with an embodiment of the invention. The wrapped bundle of consumer goods 10 comprises a paper carrier layer 12 and a conductive layer 13, the conductive layer 13 forming a power transfer receiver coil 14 on an outer surface of a front wall of the wrapped bundle of consumer goods 10. The carrier layer 12 and the conductive layer 13 together form a wrapper 16 wrapped around the bundle of consumer goods. A perforation line 18 in the carrier layer 12 forms a pull tab that can be removed by a consumer to gain access to the consumer goods inside the wrapped bundle.

The power transfer receiver coil 14 comprises a flat spirally wound conductive track having electrical connection terminals 20 formed at each end of the conductive track.

FIG. 2 shows a container 30 of consumer goods comprising an outer housing 31 comprising a box portion 32 and a lid portion 34 depending from the box portion 32 along a hinge line extending across a back wall of the container 30. An inner frame 36 is connected to the inner surface of the box portion 32 and provides a surface against which the lid portion 34 closes.

The wrapped bundle of consumer goods 10 shown in FIG. 1 is received within the box portion 32. The electrical connection terminals 20 of the power transfer receiver coil 14 are connected to an electronic device 38 provided on the front wall 40 of the box portion 32. In this embodiment, the electronic device 38 comprises an electroluminescent panel, but the skilled person will appreciate that other electronic devices could be provided on the container 30 and connected to the power transfer receiver coil 14.

For ease of construction of the container 30, the electronic device 38 is attached to an inner surface of the box portion front wall 40 and is visible through an aperture 42 in the box portion front wall 42. When the container 30 is placed within a suitable time varying magnetic field, an electrical current is induced in the power transfer receiver coil 14 and powers the electronic device 38.

The invention claimed is:

1. A container of consumer goods comprising:
a wrapped bundle of consumer goods comprising a wrapper wrapped around one or more consumer goods, the wrapper comprising a folded multilayer laminar blank comprising at least one carrier layer and at least one conductive layer that is applied directly to a surface of the carrier layer, the at least one conductive layer forming at least one power transfer receiver coil configured to wirelessly receive a supply of electrical energy;
an outer housing containing the wrapped bundle of consumer goods; and
the outer housing comprising an electronic device connected to the at least one power transfer receiver coil to receive the supply of electrical energy.

2. A container according to claim 1, wherein the wrapped bundle of consumer goods comprises a front wall, a back wall, a top wall, a bottom wall and two side walls, and wherein the at least one power transfer receiver coil is provided on two or three of the walls.

3. A container according to claim 2, wherein the walls on which the at least one power transfer receiver coil is provided are non-opposing walls.

4. A container according to claim 1, wherein the outer housing comprises an inner surface facing the wrapped bundle of consumer goods, wherein the connection between the electronic device and the at least one power transfer receiver coil underlies the inner surface of the outer housing, and wherein at least a portion of the electronic device is visible from the outside of the container.

5. A container according claim 1, wherein the electronic device comprises at least one of an electroluminescent device, an electro-acoustic device, and an electro-mechanical device.

6. A container according to claim 1, wherein the at least one carrier layer has a first surface on which the at least one power transfer receiver coil is provided, the first surface having a Parker Print-Surf roughness of less than 2 micrometers measured in accordance with ISO 8791-4.

7. A container according to claim 1, wherein the bundle of consumer goods comprises a plurality of smoking articles.

8. A system for operating an electronic device provided on a container of consumer goods, the system comprising:
   a container of consumer goods according to claim 1; and
   a power transfer transmitter configured to generate a time-varying magnetic field, wherein the time-varying magnetic field induces the supply of electrical energy in the at least one power transfer receiver coil when the container of consumer goods is positioned within the time-varying magnetic field.

9. A container according to claim 2, wherein the outer housing comprises an inner surface facing the wrapped bundle of consumer goods, wherein the connection between the electronic device and the at least one power transfer receiver coil underlies the inner surface of the outer housing, and wherein at least a portion of the electronic device is visible from the outside of the container.

10. A container according to claim 3, wherein the outer housing comprises an inner surface facing the wrapped bundle of consumer goods, wherein the connection between the electronic device and the at least one power transfer receiver coil underlies the inner surface of the outer housing, and wherein at least a portion of the electronic device is visible from the outside of the container.

11. A container according claim 4, wherein the electronic device comprises at least one of an electroluminescent device, an electro-acoustic device, and an electro-mechanical device.

12. A container according to claim 5, wherein the bundle of consumer goods comprises a plurality of smoking articles.

13. A container according to claim 6, wherein the bundle of consumer goods comprises a plurality of smoking articles.

* * * * *